(12) United States Patent
Krietzman et al.

(10) Patent No.: US 6,605,782 B1
(45) Date of Patent: Aug. 12, 2003

(54) VERTICAL CABLE MANAGEMENT RACK

(75) Inventors: William Drew Krietzman, Elk, WA (US); Enrie Rillo Ballesteros, Northridge, CA (US); Bryan Joel Melamed, Canoga Park, CA (US)

(73) Assignee: Chatsworth Products, Inc., Westlake Village, CA (US)

( * ) Notice: Subject to any disclaimer, the term of this patent is extended or adjusted under 35 U.S.C. 154(b) by 0 days.

(21) Appl. No.: 10/192,896

(22) Filed: Jul. 11, 2002

Related U.S. Application Data

(62) Division of application No. 09/954,344, filed on Sep. 17, 2001.
(60) Provisional application No. 60/233,203, filed on Sep. 15, 2000.

(51) Int. Cl.⁷ .................................................. H02G 3/04
(52) U.S. Cl. ......................... 174/101; 211/26; 361/826
(58) Field of Search ............................... 174/100, 101; 211/26; 248/65; 361/825, 826, 829

(56) References Cited

U.S. PATENT DOCUMENTS

| | | | |
|---|---|---|---|
| 555,583 A | 3/1896 | Pletcher | 16/231 |
| 1,381,335 A | 6/1921 | Reed | 16/231 |
| 2,531,110 A | 11/1950 | Cisler | 174/52 |
| 2,817,870 A | 12/1957 | Howell | 16/147 |
| 2,848,826 A | 8/1958 | Heble | 16/231 |
| 2,921,607 A | 1/1960 | Caveney | 138/75 |
| 3,008,177 A | 11/1961 | Wooten, Jr. | 16/147 |
| 3,488,795 A | 1/1970 | Marguelisch | 16/147 |
| 3,705,949 A | 12/1972 | Weiss | 174/101 |
| 3,890,459 A * | 6/1975 | Caveney | 174/101 |
| 3,966,074 A | 6/1976 | Hotchkiss et al. | 220/3.8 |
| 3,968,322 A | 7/1976 | Taylor | 174/72 A |
| 4,002,856 A * | 1/1977 | Sedlacek et al. | 361/827 |
| 4,613,174 A | 9/1986 | Berg et al. | 292/136 |
| 4,641,225 A | 2/1987 | Reichle | 361/429 |
| 4,902,852 A | 2/1990 | Wuertz | 174/48 |
| 5,086,195 A | 2/1992 | Claisse | 174/101 |
| 5,089,667 A | 2/1992 | Goussin et al. | 174/101 |

(List continued on next page.)

OTHER PUBLICATIONS

Panduit, Cable Management hinged Cover; Panduit Corp. 1999 (1 sheet).
Enteraprise™; "Structured Connectivity Systems Category 6 Solutions"; ADC Telecommunications, Inc.; Catalog (Jan., 2000).
CatRack™ Wire Management System; "The Ultimate In Vertical & Horizontal Cable Segregation for Every Building Requirement"; Catalog (May, 1996).
Hubbell Premise Wiring Mini–Catalog (2000).

*Primary Examiner*—Dean A. Reichard
*Assistant Examiner*—Adolfo Nino
(74) *Attorney, Agent, or Firm*—Kennedy Covington Lobdell & Hickman, LLP

(57) ABSTRACT

A vertical cable raceway for routing cables to electronic equipment includes a trough having a base member and two side members and at least one separable cable guide installed on the edge of a side member. The cable guide includes a plurality of projections forming cable rings for guiding cables laterally from the side of the trough.

12 Claims, 9 Drawing Sheets

U.S. PATENT DOCUMENTS

| | | | |
|---|---|---|---|
| 5,187,836 A | 2/1993 | Kim et al. | 16/231 |
| 5,326,934 A | 7/1994 | LeMaster et al. | 174/59 |
| 5,542,549 A | 8/1996 | Siemon et al. | 211/26 |
| 5,597,980 A | 1/1997 | Weber | 174/72 A |
| 5,660,120 A | 8/1997 | Sims | 108/60 |
| 5,673,632 A | 10/1997 | Sykes | 108/121 |
| 5,685,113 A | 11/1997 | Reuter et al. | 52/220.7 |
| 5,758,002 A | 5/1998 | Walters | 385/134 |
| 5,921,795 A | 7/1999 | Weener et al. | 439/215 |
| 5,934,623 A | 8/1999 | Kopish | 248/65 |
| 5,942,729 A | 8/1999 | Carlson, Jr. et al. | 174/68.1 |
| 5,971,509 A | 10/1999 | Deimen et al. | 312/223.6 |
| 6,000,769 A | 12/1999 | Chen | 312/223.2 |
| 6,003,273 A | 12/1999 | Elsholz et al. | 52/220.7 |
| 6,011,221 A | 1/2000 | Lecinski et al. | 174/72 A |
| 6,012,683 A | 1/2000 | Howell | 248/49 |
| 6,102,214 A * | 8/2000 | Mendoza | 211/26 |
| 6,181,862 B1 | 1/2001 | Noble et al. | 385/135 |
| 6,215,069 B1 | 4/2001 | Martin et al. | 174/68.3 |
| 6,285,565 B1 * | 9/2001 | .ANG.berg et al. | 361/826 |
| 6,318,680 B1 | 11/2001 | Benedict et al. | 248/49 |
| 6,347,714 B1 * | 2/2002 | Fournier et al. | 211/26 |
| 6,349,837 B1 * | 2/2002 | Serban | 211/189 |
| 6,365,834 B1 * | 4/2002 | Larsen et al. | 174/100 |
| 6,410,844 B1 * | 6/2002 | Bruner et al. | 361/826 |

* cited by examiner

VERTICAL CABLE MANAGEMENT RACK

CROSS REFERENCE TO RELATED APPLICATIONS

This application is a divisional of and thus is entitled to the benefit of, and claims priority to, non-provisional U.S. patent application Ser. No. 09/954,344, filed Sep. 17, 2001 and entitled "VERTICAL CABLE MANAGEMENT RACK," the entirety of which is hereby incorporated by reference. In addition, this application is entitled to the benefit of, and claims priority to, U.S. Patent Application Serial No. 60/233,203, filed Sep. 15, 2000 and entitled "VERTICAL CABLE MANAGEMENT RACK," the entirety of which is hereby incorporated by reference.

FIELD OF THE PRESENT INVENTION

The present invention relates generally to the field of racks for supporting computer and other electronic equipment, and more particularly to the field of enclosed vertical cable raceways having a multitude of cable rings formed in the sides thereof for precisely routing cables and wires to equipment stored in the rack.

BACKGROUND OF THE PRESENT INVENTION

Racks, frames, cabinets and the like for supporting computer and other electronic equipment are very well known. Similarly, raceways for routing cables and wires to and from that equipment are likewise well known. In particular, a number of raceways have been proposed for routing cables, wires and the like (generally referred to hereinafter as "cables") vertically through or adjacent to equipment racks, frames, cabinets and the like (generally referred to hereinafter as "racks"). Such raceways may be used to route cables vertically to equipment mounted or otherwise supported on a rack from other equipment on the rack, from overhead or underfloor raceway, or the like. These cables are generally routed in the vertical direction to a point adjacent to the desired equipment and then routed in the horizontal direction to the desired equipment.

An important characteristic of such raceways is the presence of a plurality of openings in the sides of the raceway through which cables may be routed, thereby facilitating more convenient access between the equipment and the interior of the raceway. For example, U.S. Pat. No. 2,921,607 to Caveney ("Caveney") and U.S. Pat. No. 3,705,949 to Weiss ("Weiss") each disclose a covered wiring duct or wireway which includes side walls having a series of finger-like projections separated by openings. The cables may be routed through the openings by bending them around the projections, thus allowing the cables to be routed with relative precision, and preventing cables from hanging loosely across the face of the rack itself. A gap at the distal ends of each pair of adjacent projections permits cables to be inserted into each respective opening. The gap is narrower than the opening, thus aiding in the retention of the cables within the opening. The distal ends of all the projections may then be covered by a cover, thus providing further retention capability.

Unfortunately, both the Caveney and the Weiss designs suffer from a number of drawbacks, including most particularly the relatively limited size of the openings. The openings between the Caveney projections are only approximately as large as the size of the projections themselves, and the openings between the Weiss projections, although of a somewhat unusual shape, are actually even smaller in area than the projections. Such small openings are frequently inadequate to handle the large number of cables that are frequently routed horizontally from a certain elevation on a vertical raceway to the equipment mounted thereon. Thus, vertical raceways having larger openings are required. Further, if a cover is to be installed on the Caveney or Weiss raceways, it must be carefully aligned with all of the distal ends of the projections and pressed into place, and no provision is made to allow the cover to be hinged open once installed.

More recently, a number of raceways have been developed having a small number of widely spaced fingers or other retention members projecting from a trough. Between each pair of adjacent projections is a wide opening which is many times larger than the width of the projections, such that a raceway for a full height rack might have only six or eight sets of projections. Unfortunately, because so few projections are available for the cables to be routed around, this type of raceway does not allow cables to be routed as precisely as with the Caveney and Weiss type of raceway, there is a much greater chance of cables dangling loosely, and/or cables of greater length must be used in order to reach a projection before being bent toward the desired equipment.

Still more recently, a new vertical raceway has been made available by Panduit Corp. The Panduit raceway utilizes a PVC trough attached to a steel base. The trough includes a base member and a plurality of narrow finger-like side members extending perpendicularly therefrom. A slit, narrower in width than the fingers, is formed between each pair of adjacent fingers for routing cables therethrough, similar to the Caveney design. Barbs at the distal ends of the fingers limit access to the slits to only a narrow gap, thereby preventing cables which have been installed in the slits from accidentally becoming dislodged. Advantageously, each finger is scored near the base member so that it may easily be broken off and removed, thereby creating a wider opening for receiving cables. A hingeable cover may be attached to the distal ends of the remaining fingers by clipping a plurality of hinges in between the tips of the fingers and attaching the cover thereto. The raceway may be attached to the side of a rack to route cables to electronic components mounted on or in the rack by guiding the cables vertically to a location adjacent to the selected component and then through one of the openings formed between the fingers.

Unfortunately, the Panduit raceway still suffers from a number of drawbacks. First, once fingers are broken off of the Panduit raceway to create larger openings, they cannot be replaced. Further, if one or more fingers is broken off to create a larger opening, the gap between the fingers which remain to define the opening is quite large, with very little material or structure remaining to retain the cables in the opening, other than the raceway cover. Also, the Panduit cover may be attached only using hinge members which are each mounted on the distal ends of a pair of adjacent fingers, rather than to the trough itself, thus increasing the risk of mechanical failure, particularly as the cover is opened and closed.

The Panduit, Caveney and Weiss raceways include other drawbacks as well. For example, the unibody construction of the side walls limits the construction and relative dimensions of the projections and the openings created thereby because the projections must be formed from the same material as the rest of the walls, and, in the case of Panduit and Caveney, from the same material as the base of the trough. In addition, the unibody construction limits the installation flexibility otherwise available if the projections could be selectively disposed at various locations along the raceway without affecting the body of the raceway itself.

Perhaps most significantly, none of the cable rings formed in the sides of known prior art raceways are arranged to align precisely with the equipment mounting locations on the racks to which the raceways are attached. It is well known that the vertical dimension of racks is frequently measured in standardized units. The most common unit of measurement is the "rack mounting unit" ("RMU"). An RMU is commonly defined as 1.75 inches in height. Electrical components as well as accessories, which include horizontal raceways, patch panels, and the like, are also commonly measured in RMU's. For example, a 2 RMU component is one which is 3.50 inches or less in height. Thus, a rack which has 45 RMU may accommodate components and accessories totaling 45 RMU. Further, to conserve space, components and accessories are frequently installed only at vertical locations corresponding to a whole number of RMU's in order to avoid interfering with adjacent components and accessories.

Unfortunately, none of the known prior art raceways take this arrangement into consideration. Thus, the cable rings or similar structures provided on prior art vertical raceways are not properly aligned with the equipment and accessories to which they must route the cables. As a result, the shortest path from the interior of the raceway to the equipment or accessory destination is frequently blocked by the body of one of the finger-like projections. Moreover, smaller components and accessories may not have any cable rings whatsoever disposed next to them. For high density wiring routes, cable rings may become unnecessarily overcrowded because they must be diverted through other cable rings. Thus, a need exists for a cable raceway having cable rings disposed at a standardized interval which corresponds to the mounting locations of the equipment and accessories stored in the rack.

SUMMARY OF THE PRESENT INVENTION

Briefly summarized, the present invention relates to vertical cable raceways for precisely routing cables to electronic components at particular elevations in a cabinet, frame or other mounting rack. Broadly defined, the cable raceway according to one aspect of the present invention includes: a trough having a base member and two side members; and at least one separable cable guide installed on the edge of a side member, the cable guide including a plurality of projections forming cable rings for guiding cables laterally from the side of the trough.

In features of this raceway, the cable rings are disposed relative to each other at an interval corresponding to a standard rack mounting unit; the interval is exactly one standard rack mounting unit; a dimension of each cable ring is selected to correspond to a standard rack mounting unit; the trough is made from a first material, which may be a metal, and the cable guide is made from a second material, which may be a plastic; a side member includes an aperture, and the cable guide includes a correspondingly-disposed boss for mating with the aperture when the cable guide is installed on the side member; the cable guide includes at least two planar members forming a channel therebetween, and an edge of a side member is disposed in the channel when the cable guide is installed on the side member; one of the planar members is a planar flange extending generally the length of the cable guide; another of the planar members is a tab which may be one of a series of tabs aligned along the cable guide; the cable guide includes a positioning boss for guiding the cable guide into place on the side member; and a side member includes a slot extending toward the cable guide and the positioning boss is adapted to engage with the slot.

In a second aspect of the present invention, a cable raceway for routing cables to electronic equipment includes: a trough having a base member and two side members, at least one of the side members including a primary longitudinal portion extending from the base member and a secondary longitudinal portion, the secondary longitudinal portion being inwardly offset from the primary longitudinal portion; and a cable guide, including a plurality of projections, disposed along a distal edge of the secondary longitudinal portion and extending in a direction generally perpendicular to the base member of the trough, wherein the cable guide extends laterally beyond the secondary longitudinal portion, and wherein the primary longitudinal portion extends laterally beyond the cable guide.

In features of the second aspect, the primary and secondary longitudinal portions are planar in form and the primary and secondary longitudinal portions are generally parallel to each other; the cable guide includes a channel and a distal edge of the secondary longitudinal portion is disposed within the channel; a second side member includes a primary longitudinal portion extending from the base member and a secondary longitudinal portion inwardly offset from the primary longitudinal portion, wherein a second cable guide includes a plurality of projections and is disposed along a distal edge of the secondary longitudinal portion of the second side member and extends in a direction generally perpendicular to the base member of the trough, wherein the cable guide extends laterally beyond the secondary longitudinal portion of the second side member, and wherein the primary longitudinal portion of the second side member extends laterally beyond the cable guide; and the primary longitudinal portions of the side members define a maximum width of the cable raceway and the width defined by the outermost surfaces of the cable guides is less than the maximum width of the cable raceway.

In a third aspect of the present invention, a rack for mounting electronic equipment includes: a pair of vertical support members for supporting at least one electronic component, wherein the vertical support members define a plurality of mounting locations; and a vertical cable raceway disposed generally adjacent one of the vertical support members, the raceway having a trough and a plurality of outwardly extending projections forming a plurality of cable rings, wherein each cable ring is disposed at a height corresponding to one of the mounting locations defined by the vertical support members.

In features of the third aspect, the mounting locations are disposed at a standard interval from each other; the standard interval corresponds to a whole number of standard rack mounting units; the standard interval is a single standard rack mounting unit; a cable ring is disposed adjacent to each of substantially all of the mounting locations and aligned therewith; and each cable ring is disposed at a height corresponding to a whole number of standard rack mounting units.

The present invention also includes a method of routing cables in a equipment mounting rack, wherein the method includes the steps of: providing a rack having a plurality of equipment and accessory mounting locations at positions corresponding to a standardized rack mounting unit; providing a vertical cable raceway having a trough and a plurality of outwardly extending projections forming a plurality of cable rings; and attaching the raceway to the rack such that each cable ring is aligned with a mounting location.

In features of this method, the step of providing a rack includes providing a rack having a plurality of equipment and accessory mounting locations at intervals of one rack mounting unit; and the step of providing a vertical cable raceway includes providing a vertical cable raceway having a plurality of outwardly extending projections forming a plurality of cable rings disposed at intervals of one rack mounting unit.

In another aspect of the present invention, a rack for mounting electronic equipment includes: a pair of vertical support members for supporting at least one electronic component; a vertical cable raceway disposed generally adjacent one of the vertical support members and having a trough and a plurality of outwardly extending projections forming a plurality of cable rings, wherein each projection includes a reinforced base tapering to a narrow shaft and a crosspiece disposed at the distal end of the shaft, wherein each cable ring and each shaft have a vertical dimension, and wherein the vertical dimension of each cable ring is substantially larger than the vertical dimension of each shaft.

In features of this aspect, the vertical dimension of the each cable ring is more than three times as large as the vertical dimension of each shaft; and the distance between the centers of adjacent projections is substantially equal to a standard rack mounting unit.

In yet another aspect of the present invention, a cable raceway for routing cables to electronic equipment includes: a channel assembly having a trough and a plurality of projections extending therefrom, the projections for guiding cables laterally from a side of the trough, wherein each projection has a distal end; and a cover assembly having a cover and a plurality of hinge supports, wherein the cover is disposed at the distal ends of the projections, wherein the structure of each hinge support is reinforced relative to the structure of the projections to support the weight of the cover, and wherein each hinge support is disposed adjacent to a plurality of projections.

In features of this aspect of the present invention, each hinge support has a proximal end and a distal end, the hinge support being supported at its proximal end by the trough, and the distal end of the hinge support supporting the cover; cable rings are formed by adjacent pairs of projections; the projections are generally T-shaped; a narrow gap is formed in each cable ring between adjacent projections, and the vertical dimension of the gap is substantially smaller than the vertical dimension of the cable ring; each hinge support includes a hinge and the cover may be hinged open and supported on the hinges; the projections are disposed at intervals substantially equal to one standard rack mounting unit; the hinge support has a vertical dimension substantially equivalent to the projection intervals; the trough defines two sides, at least one hinge support is disposed along each side, and the cover may be hinged open about the hinge supports on either side of the trough; and each hinge support has a vertical dimension substantially equal to a single rack mounting unit.

In still another aspect of the present invention, a cable raceway for routing cables to electronic equipment includes: a double-channel assembly having at least one base member and at least one pair of side members, forming two separate back-to-back channels, and a plurality of projections extending from the side members for guiding cables laterally from a side of the double-channel assembly; and a pair of cover assemblies, each having a cover having at least two lateral edges and at least one hinge disposed along each lateral edge, wherein the cover may be hinged open about the hinges along either lateral edge of the cover.

In a feature of this aspect, the cable raceway includes a plurality of lock assemblies, wherein each hinge has an individual lock assembly associated therewith, each lock assembly being selectively deployable in at least two states, wherein the deployable states include a locked state wherein the cover may be hinged open about the hinge corresponding to the lock assembly, and an unlocked state wherein the cover may be separated from the channel at the hinge corresponding to the lock assembly.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
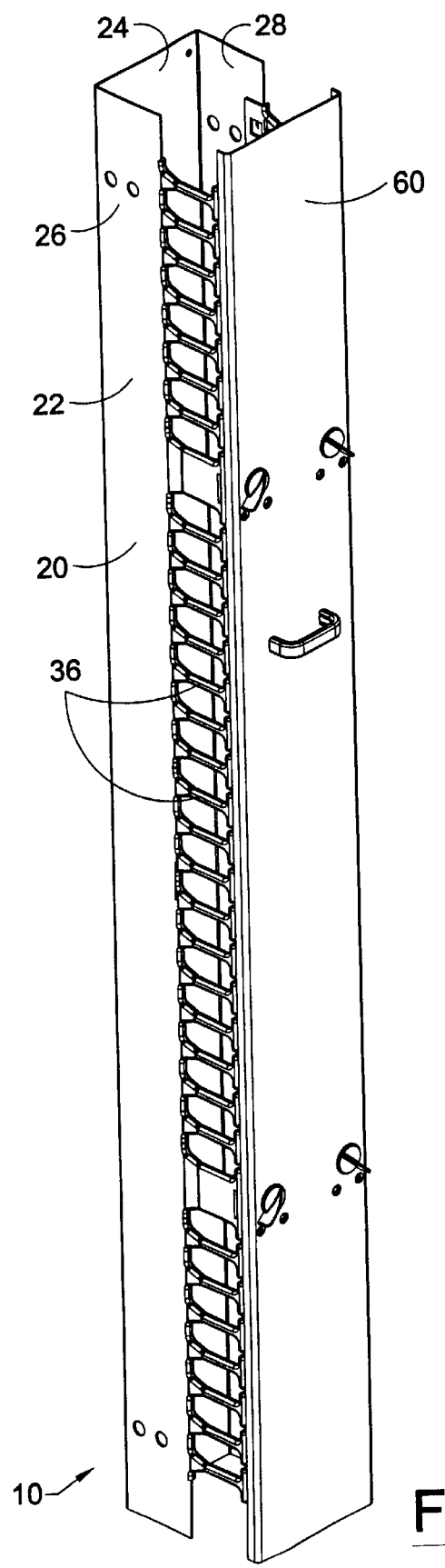
FIG. 1 is a perspective view of a vertical cable raceway in accordance with a first preferred embodiment of the present invention.
Figure 2:
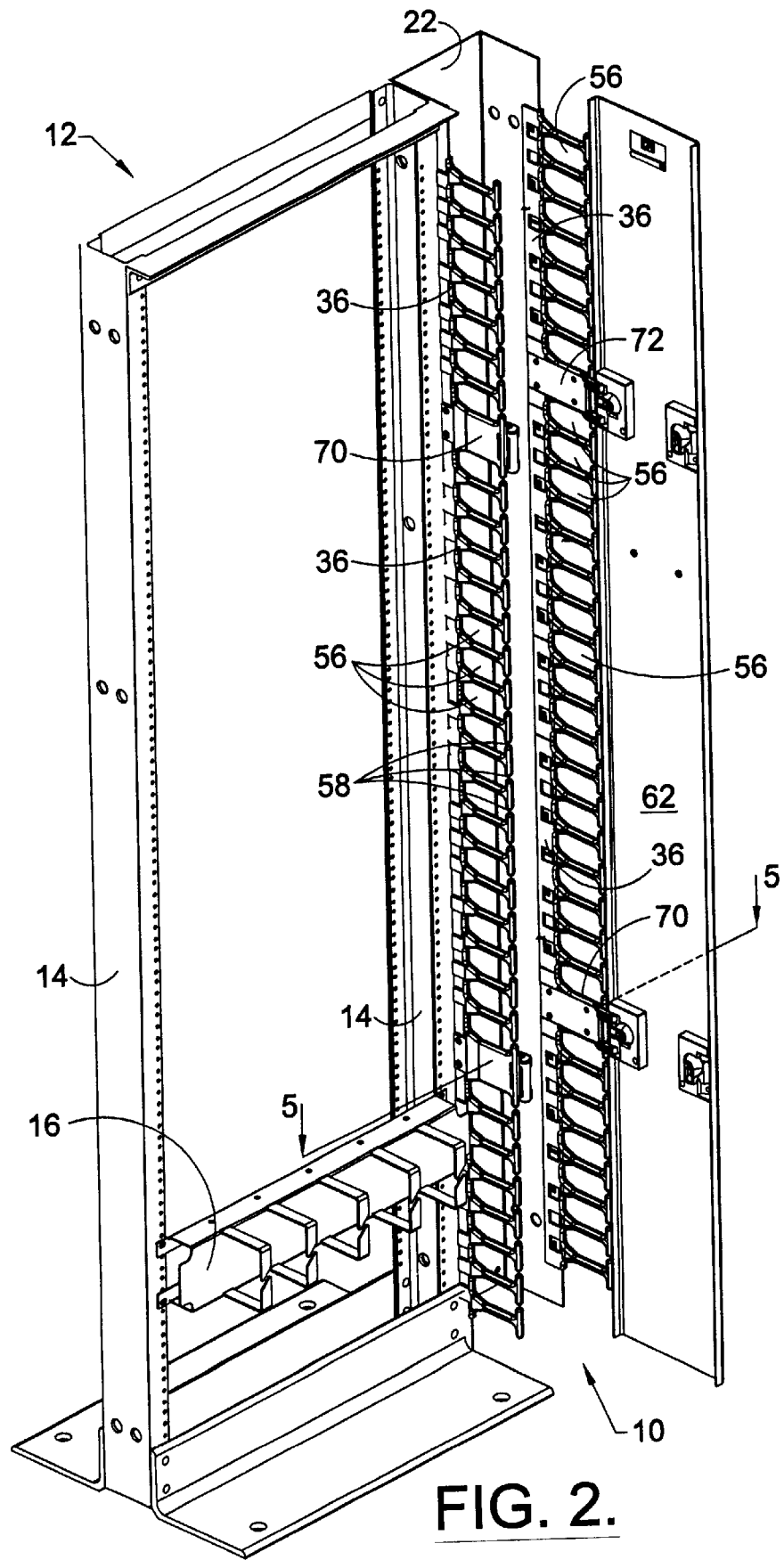
FIG. 2 is a perspective view of the vertical cable raceway of FIG. 1 in a typical rack mounting arrangement.

FIG. 1 is a perspective view of a vertical cable raceway 10 in accordance with a first preferred embodiment of the present invention. In this embodiment, the vertical cable raceway 10 comprises a channel assembly 20 and a cover assembly 60. The channel assembly 20 includes a trough 22 and a plurality of cable guides 36. The trough 22 has a base member 24 and two side members 26, 28 extending perpendicularly therefrom. The trough 22 may be formed from a sheet of suitable metal, such as aluminum or steel, and bent into shape, or it may be machined or extruded from a suitable metal material. As perhaps best illustrated in FIG. 3, each side member 26, 28 includes a plurality of circular apertures 30 for mounting the trough 22 to a rack 12, frame, cabinet or the like, as shown in FIG. 2, and an evenly-spaced series of small rectangular apertures 32 extending along its outer edge for mounting the cable guides 36 thereto.

Figure 3:
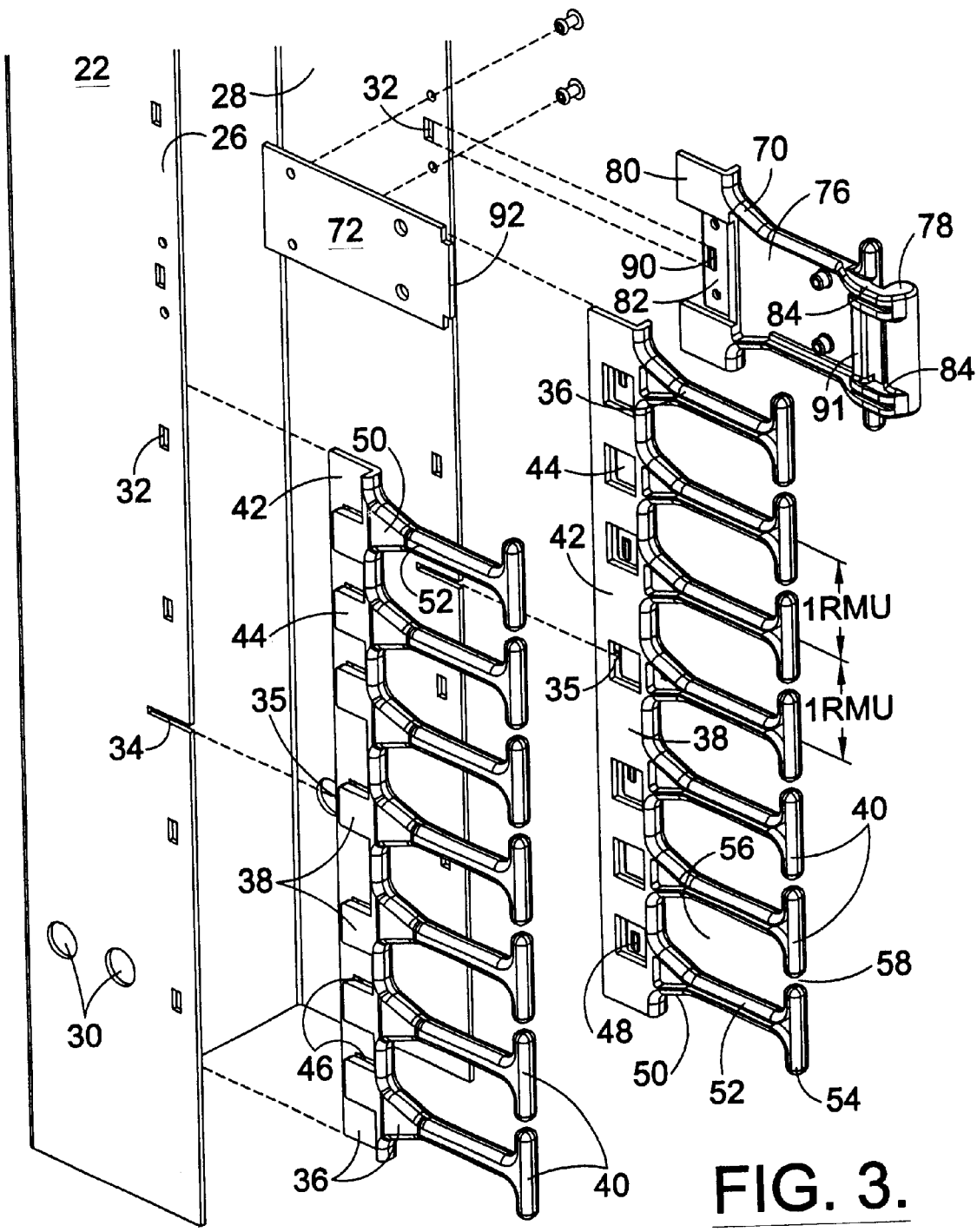
FIG. 3 is an exploded perspective view of a portion of the vertical cable raceway of FIG. 1.

FIG. 3 is an exploded perspective view of a portion of the vertical cable raceway 10 of FIG. 1. Each cable guide 36 includes a linear projection support bracket 38 and a plurality of T-shaped projections 40 extending therefrom. The projection support bracket 38 has a planar flange 42 and a series of tabs 44 forming a channeled recess 46 therebetween. Evenly-spaced bosses 48 are disposed on the inward-facing surfaces of at least some of the tabs 44 for mating with the rectangular apertures 32 in the side members 26, 28 of the trough 22. The cable guide 36 may be mounted on a side member 26, 28 of the trough 22 by aligning the bosses 48 on the tabs 44 with the rectangular apertures 32 in the trough 22 and then inserting the side member 26, 28 into the channeled recess 46 between the planar flange 42 and the series of tabs 44. As the side member 26, 28 is inserted, the bosses 48, which are preferably beveled, may make contact with the side member 26, 28, thus urging the lateral deflection of the tabs 44. As the edge of the side member 26, 28 is seated in the bottom of the channeled recess 46, the bosses 48 spring back into the rectangular apertures 32 and are thereafter retained therein, thus preventing the cable guide 36 from being removed.

In a feature of the present invention, one or more slots 34 may extend inward from the edge of each side member 26, 28, and at least one positioning boss 35 may be disposed on each projection support bracket 38. Alignment of the cable guide 36 with the side member 26, 28 may then be facilitated by aligning the positioning boss 35 with the slot 34 and inserting it therein. This causes the other bosses 48 to be properly aligned with the rectangular apertures 32, and the continuing disposition of the positioning boss 35 within the slot 34 aids in guiding the cable guide 36 onto the edge of the side member 26, 28 until fully seated thereon.

Each T-shaped projection 40 includes a reinforced base 50, a shaft 52 and a crosspiece 54. Each pair of adjacent T-shaped projections 40 defines a cable ring 56 formed by the respective bases 50, shafts 52 and crosspieces 54 of the projections 40 and the body of the projection support bracket 38. An opening into each cable ring 56 is provided by a gap 58 between the ends of the crosspieces 54 of each pair of adjacent projections 40. This gap 58 permits cables to be inserted into the ring 56 by passing them sideways through the gap 58, as described further hereinbelow.

The respective projections 40 are evenly spaced along the length of the cable guide 36 at a standardized spacing. In the embodiment shown and described, the spacing between the respective projections 40 is equal to a single standard rack mounting unit ("RMU"), but it should be obvious that other standard spacings could be used such as spacings measured in alternative units or spacings which are multiples of the RMU. By using such a standard spacing, it is ensured that a cable ring 56 is disposed at, and dedicated to, each RMU along the height of a rack 12. The benefit of this will become further evident below.

Because the cable guide 36 is formed separately from the trough 22 and subsequently attached thereto, rather than being formed integrally therewith, the cable guide 36 may be formed from a different material than the trough 22. Thus, although the trough 22 may preferably be formed from metal, the cable guides 36 may be injection-molded from plastic in order to create rounded or beveled edges along the edges of the T-shaped projections 40. The rounded edges of the cable rings 56 do not chafe cables inserted therein like the sharp metal edges of prior art raceways would, while the rounded edges and corners of the edges of the ends of the crosspieces 54 enable cables being installed in the cable rings 56 to be smoothly guided through the gaps 58. In addition, by forming the shafts 52 of the projections 40 from plastic rather than from sheet metal, the width of the shafts 52 may be reduced while still providing the requisite strength and resiliency, thus allowing the cable rings 56 to be widened considerably relative to the width of the shafts 52. As a result, each cable ring 36 includes a C-shaped opening having concave top and bottom portions and a narrow entry gap 58 relative to the width and height of the ring 56, thus maximizing the utility of the cable ring 56 in receiving and retaining a greater number of cables therein than was previously possible.

Figure 4:
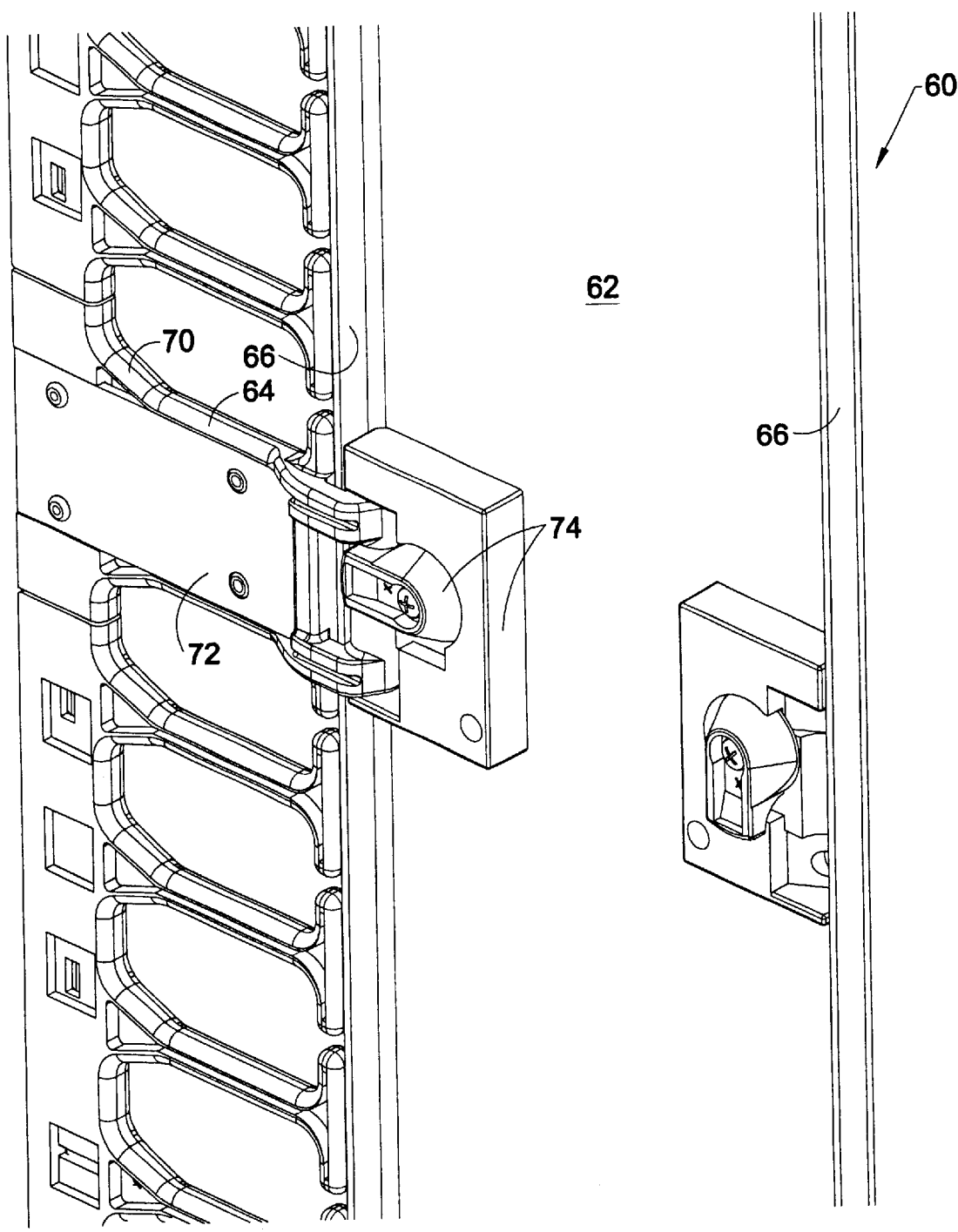
FIG. 4 is a perspective view of a portion of the vertical cable raceway of FIG. 2 illustrating the attachment of the cover assembly to the channel assembly.

FIG. 4 is a perspective view of a portion of the vertical cable raceway 10 of FIG. 2 illustrating the attachment of the cover assembly 60 to the channel assembly 20. The cover assembly 60 includes a cover 62 and a plurality of hinge supports 64. The cover 62 may be formed from sheet metal. Flanges 66 are formed along the lateral edges of the cover 62 to provide strength along the length of the cover 62 as well as for use with the hinging mechanism of the hinge supports 64 as described below. The cover 62 also includes a plurality of openings 68, perhaps best illustrated in FIG. 6, for use with the hinge supports 64. Each hinge support 64 includes a cover support 70, a cover support bracket 72 and a hinge/lock block assembly 74.

Referring again to FIG. 3, each cover support 70, which may be injection-molded from plastic, includes a body portion 76, a hinge pivot shaft 78 disposed at one end of the body portion 76 and inner and outer mounting tabs 80, 82 disposed at the opposite end. The hinge pivot shaft 78 may be supported by support members 84 which are inwardly offset to create a channeled area 86 between the end of the body portion 76 and the hinge pivot shaft 78, perhaps best illustrated in FIG. 5. This channeled area 86 is adapted to receive the edge of one of the flanges 66 along the lateral edges of the cover 62 when the cover 62 is hinged open, as further described hereinbelow.

Figure 5:
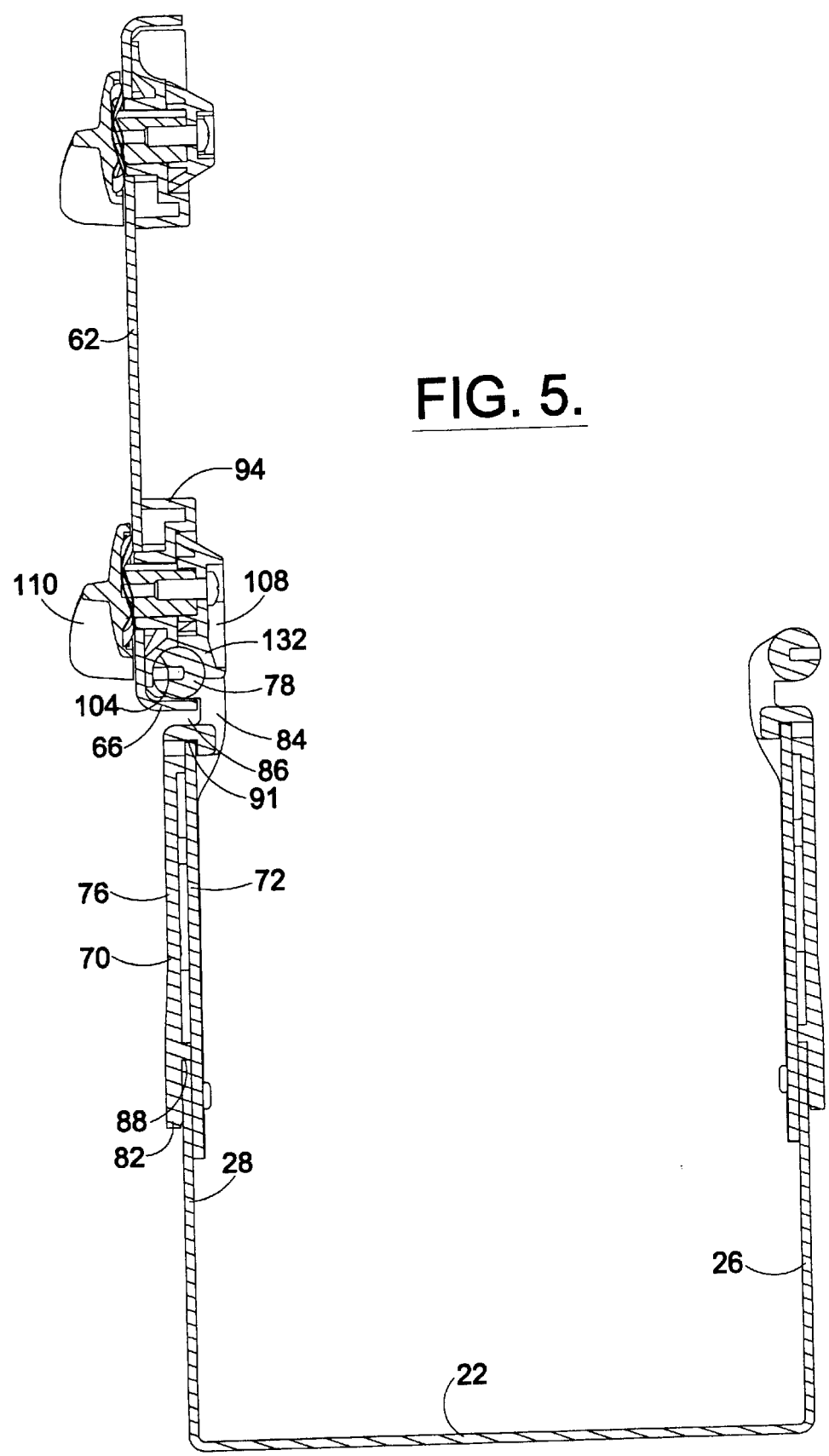
FIG. 5 is a top cross-sectional view of the vertical cable raceway of FIG. 2 taken along line 5—5.

Like the channel 46 formed by the tabs 44 of the projection support bracket 38, a channeled recess 88 is formed between the inner and outer mounting tabs 80, 82 of the cover support 70, as perhaps best shown in FIG. 5. A boss 90 is disposed on the inward-facing surface of the outer tab 82 for mating with one of the rectangular apertures 32 in the side members 26, 28 of the trough 22. The cover support 70 may be mounted on a side member 26, 28 of the trough 22, adjacent to one or more cable guides 36 by aligning the boss 90 on the inward-facing surface of the outer tab 82 with a rectangular aperture 32 in the trough 22 and then inserting the side member 26, 28 into the channeled recess 88 between the inner and outer tabs 80, 82. As the side member 26, 28 is inserted, the boss 90, which is preferably beveled, may make contact with the side member 26, 28, thus urging the lateral deflection of the outer tab 82. As the edge of the side member 26, 28 is seated in the bottom of the channeled recess 88, the boss 90 springs back into the rectangular aperture 32 and is thereafter retained therein, thus preventing the cover support 70 from being removed. Further strength may be imparted by passing fasteners through mounting apertures in the cover supports 70 and the trough 22.

The shape of the sides of the body portion 76 is similar to the shape of the sides of the T-shaped projections 40. Each side of the body portion 76, together with the T-shaped projection 40 adjacent thereto, defines a cable ring 56 formed by the base 50, shaft 52 and crosspiece 54 of the adjacent projection 40 and the correspondingly-shaped side of the body portion 76. An opening into each cable ring 56 is provided by a gap 58 between the end of the crosspiece 54 of the adjacent T-shaped projection 40 and the similar protrusion on the side of the body portion 76. This gap 58 permits cables to be inserted into the ring 56 by passing them sideways through the gap 58, as described further hereinbelow. The cover support 70 is preferably one RMU in size, and the cable rings 56 formed above and below it are preferably of the same dimensions as the cable rings 56 formed by the cable guides 36. Once again, the benefit of this will become further evident below.

Referring to FIGS. 3 and 5, the cover support 70 may be further strengthened by the use of a cover support bracket 72 formed from sheet metal. A tab 92 may be disposed at one end of the bracket 72 to be inserted into an undercut 91 in the end of the body portion 76 of the cover support 70, and the body of the cover support bracket 72 may rest against the body portion 76 of the cover support 70. In this position, the end of the cover support bracket 72 is disposed between, and substantially coplanar with, the inner mounting tabs 80 of the cover support 70. The same fasteners used to secure the outer mounting tab 82 of the cover support 70 to the side member 26, 28 of the trough 22 may also be used to attach the cover support bracket 72 on the opposite surface of the side member 26, 28.

Figure 6:
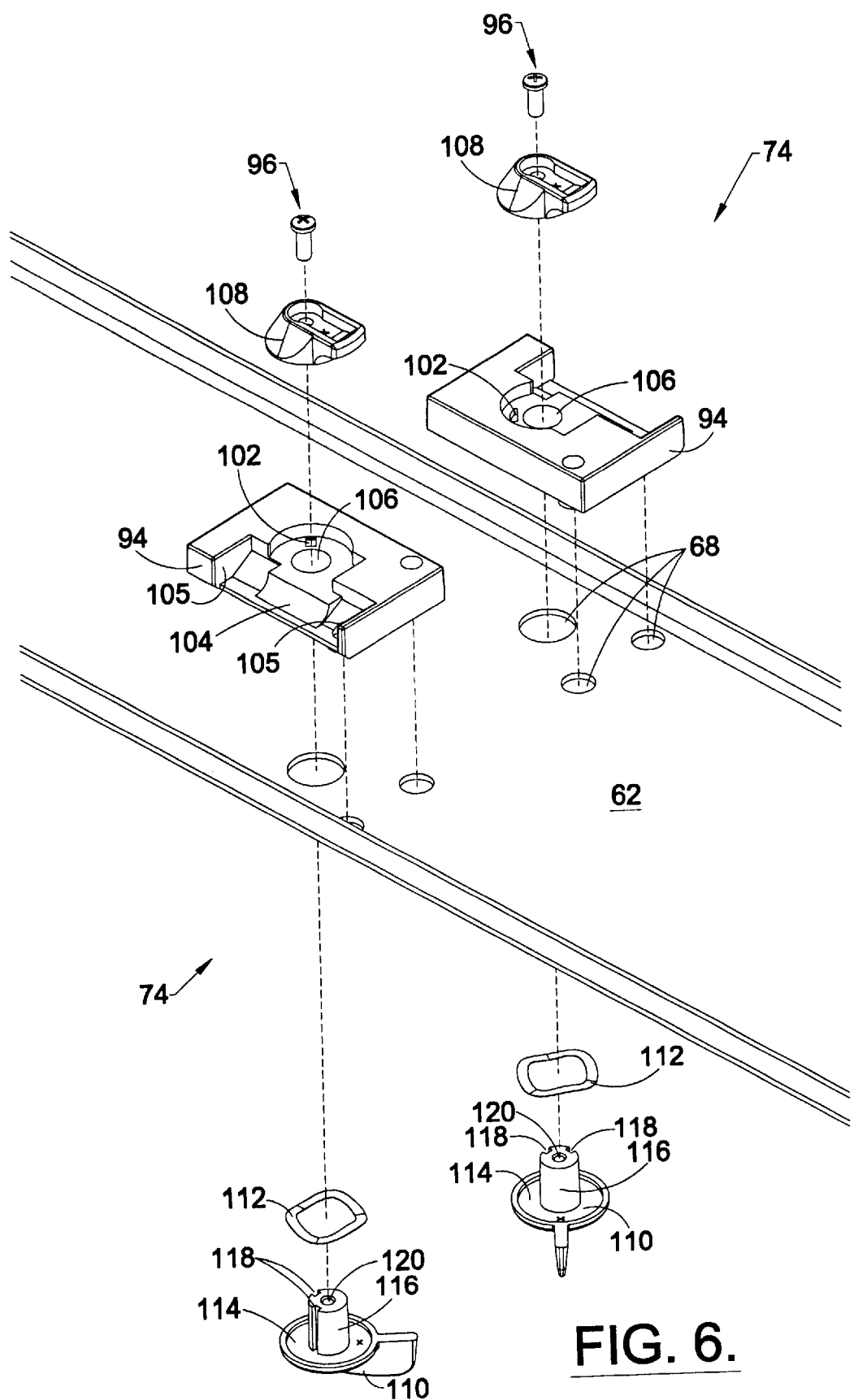
FIG. 6 is an exploded perspective view of portions of the cover assembly shown in FIG. 1, including the hinge/lock block assembly.
Figure 7:
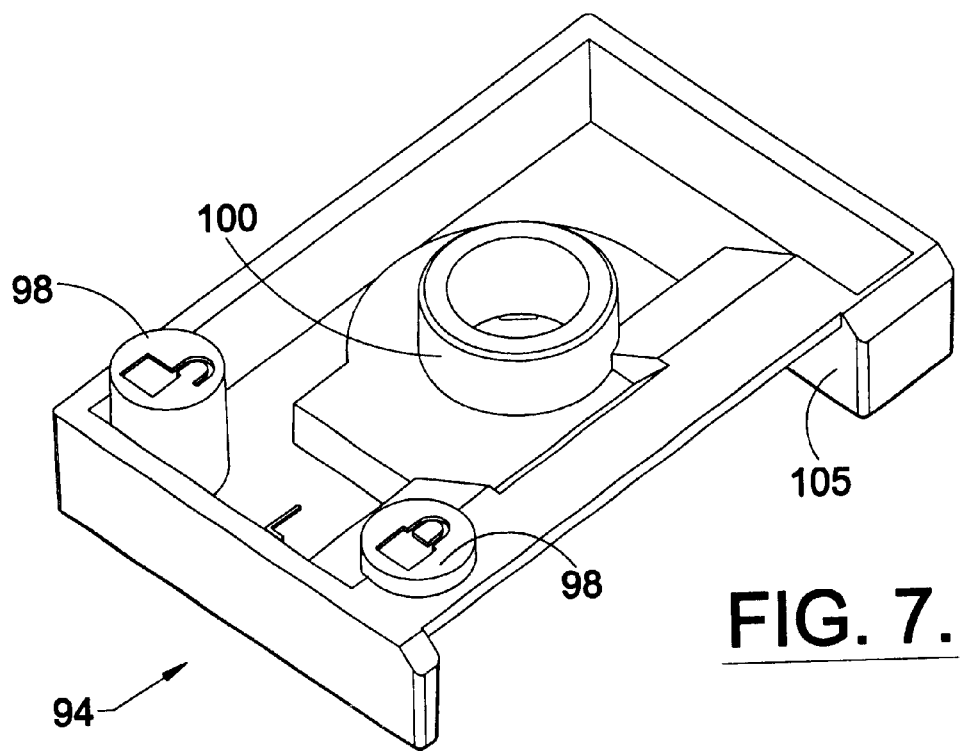
FIG. 7 is a rear perspective view of the hinge block of FIG. 6.

FIG. 6 is an exploded perspective view of portions of the cover assembly 60 shown in FIG. 1, and FIG. 7 is a rear perspective view of the hinge block 94 of FIG. 6. Each hinge/lock block assembly 74 includes a hinge block 94 and a lock assembly 96. The hinge block 94 has a pair of locating bosses 98, a lock boss 100, a lock stop 102, a pivot face 104 disposed in a recessed area between two inwardly facing support faces 105, and a lock knob hole 106. The block 94 is installed on the inside of the cover 62 with the lock boss 100 and locating bosses 98 protruding through openings 68 in the cover 62. The lock assembly 96 includes a lock 108, a lock knob 110 and a wave spring washer 112. The lock knob 110 includes a recessed area 114, a lock knob shaft 116 having a pair of lock knob slots 118 therein, and an axial central hole 120. The spring washer 112 is retained around the shaft 116 in the recessed area 114 to frictionally maintain the lock 108 in the desired disposition, and the shaft 116 is inserted through the lock knob hole 106 in the hinge block 94 with the washer 112 disposed between the knob 110 and the outside surface of the cover 62.

Figure 8:
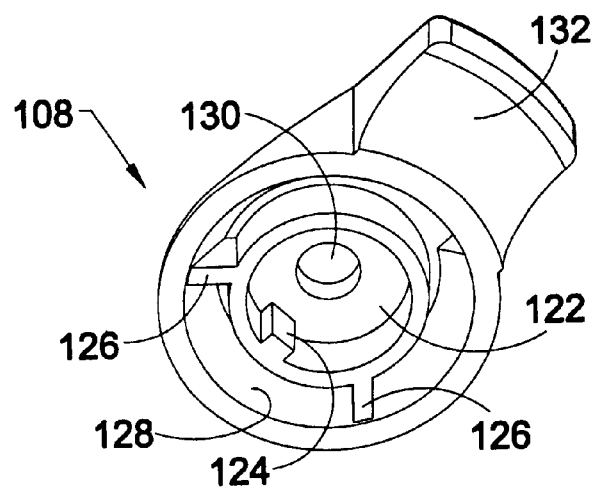
FIG. 8 is a rear perspective view of the lock of FIG. 6.

FIG. 8 is a rear perspective view of the lock 108 of FIG. 6. The lock 108 has a center hole 122, a first rib 124 on the inside of the center hole 122, a pair of lock stops or ribs 126 outside the center hole 122, a circular groove 128 extending circumferentially between the lock stops 126, a screw hole 130 and a lock hook 132. Referring again to FIG. 6, the center hole 122 mounts onto the lock knob shaft 116 with the rib 124 in one of the lock knob slots 118. The lock 108 is positioned so that the hinge block lock stop 102 is trapped in the circular groove 128 formed between the lock stops 126, the length of which serves to limit the rotation of the knob 110 and to define the open and closed positions of the lock 108. A screw is installed through the screw hole 130 and into the central hole 120 of the lock knob 110 to retain it thereto.

In a preferred embodiment, at least two hinge/lock block assemblies 74 are disposed along each lateral edge of the cover 62 to enable the cover 62 to be hinged open on either lateral edge, as illustrated in FIG. 2. A cover support 70 and cover support bracket 72 corresponding to each hinge/lock block assembly 74 are disposed at appropriate locations on the trough 22. Referring again to FIG. 5, the cover 62 may then be mounted onto the trough 22 by first placing the locks 108 along at least one lateral edge of the cover 62 in their open positions. The cover 62 is then positioned so that each corresponding cover support hinge pivot shaft 78 is trapped between the flange 66 along that lateral edge of the cover 62 and the pivot face 104 of the hinge block 94. The vertical load of the cover 62 is supported by one of the hinge block support faces 105 resting on the end of the hinge pivot shaft 78. Once the hinge/lock block assemblies 74 are placed in this position, the lock knobs 110 may be rotated to their closed positions. In the closed position, each lock hook 132 is positioned over its respective hinge pivot shaft 78 and between the support members 84. When so closed, the hinge pivot shaft 78 thus functions as a pin enclosed within a generally cylindrical barrel formed by the lock hook 132, the cover flange 66, and the hinge block pivot face 104. The cylindrical shape of the barrel is created by the arcuate surfaces of the hinge block pivot face 104 and the underside of the lock hook 132. In this arrangement, the axis of rotation of each lock knob 110 is generally perpendicular to the axis of rotation of the hinge block 94 about the cover support hinge pivot shaft 78.

In a preferred embodiment, the cover support 70 and cover support brackets 72 of the hinge/lock block assemblies 74 are interspersed between cable guides 36 along the side members of the trough 22, as illustrated in FIG. 2. Because all of the cable rings 56 formed along the cable guides 36, all of the cable rings 56 formed between the ends of the cable guides 36 and the cover supports 70 disposed therebetween, and all of the cover supports 70 themselves are preferably each a single RMU in vertical length, each cable ring 56 is thus disposed at a particular RMU segment location along the rack 12 to which the vertical cable raceway 10 is attached. Further, as described previously, electrical components and accessories such as horizontal raceways 16, patch panels (not shown) and other cable routing apparatuses are frequently sized and measured in whole numbers of RMU's. Thus, by installing such components and accessories at particular RMU segment locations along the rack 12, an installer can be assured that at least one cable ring 56 will substantially always be located laterally adjacent to each component or accessory so installed. In an exception to this arrangement, a component or accessory having a height of only a single RMU and disposed immediately adjacent one of the cover supports 70 may not have a cable ring 56 located laterally adjacent thereto. Thus, for example, a rack 12 of 45 RMU to which is attached a vertical cable raceway 10 that uses a cover assembly 60 having three hinge supports similar to the hinge supports 64 illustrated herein would have forty-two usable cable rings 56, meaning that 93% of the RMU's in the rack 12 would have a cable ring 56 immediately adjacent thereto. Similarly, a rack 12 of 20 RMU which uses a cover assembly 60 having two hinge supports similar to the hinge supports 64 illustrated herein would have eighteen usable cable rings 56, meaning that 90% of the RMU's in the rack 12 would have a cable ring 56 immediately adjacent thereto. It should be understood, however, that cable supports 70 may alternatively be designed with a structure forming a cable ring 56 without departing from the scope of the present invention.

In operation, the vertical cable raceway 10 may be attached to the side of a rack 12 using some or all of the circular apertures 30 in one side member 26, 28 of the trough 22 and suitable fasteners. As illustrated, the rack 12 may include one or more pairs of vertical support members 14 to which the raceway 10 may be attached directly, or the raceway 10 may alternatively be mounted adjacent the vertical support members 14 using some other additional support structure (not shown). With the cover 62 either hinged open on the side of the raceway 10 adjacent to the rack or removed entirely, cables may easily be installed vertically through the raceway 10 merely by moving the cables sideways into the trough 22. If one or more cable needs to be routed horizontally from the trough 22 to a component or accessory installed on or in the rack, each such cable may be bent and inserted sideways through the gap 58 in one of the cable rings 56 immediately adjacent to the chosen component or accessory. Other cables may likewise be routed through the same cable ring 56, a different cable ring 56 to the same component or accessory, or to a different location altogether. Once all cable routing in both the vertical and horizontal directions is complete, the cover 62 may then be closed, in order to retain the respective cables in place, by either hinging the cover 62 closed and locking it as described previously, or by installing the unattached cover 62 on the cover supports 70, also as described previously.

Figure 9:
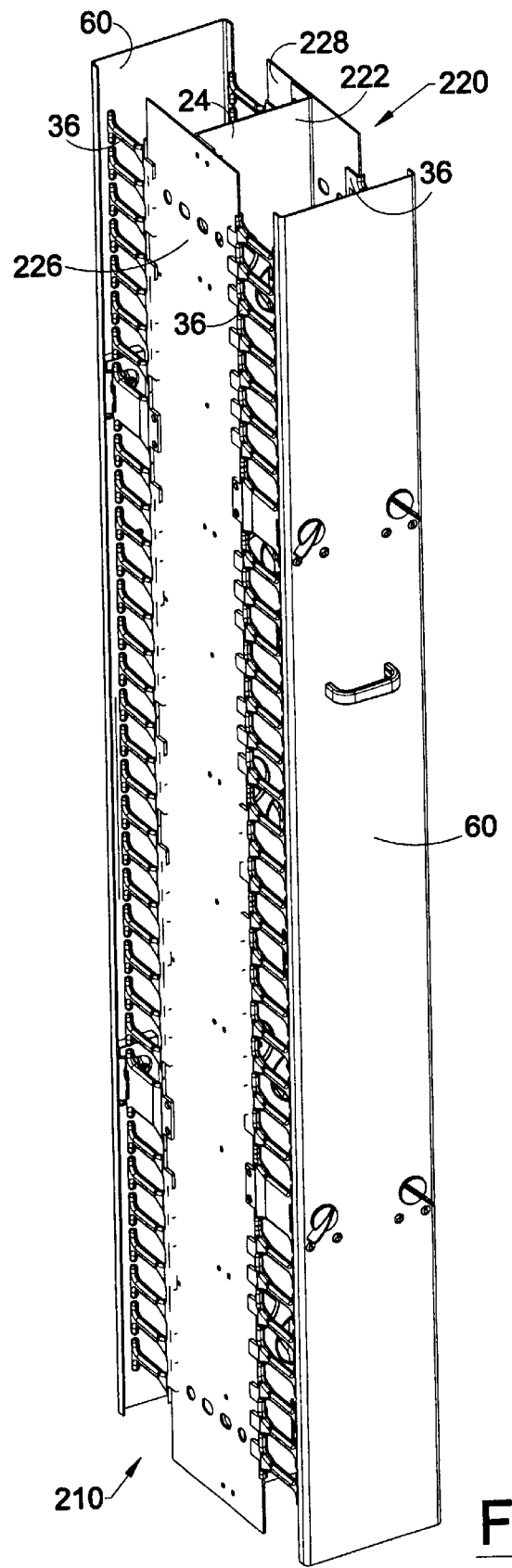
FIG. 9 is a perspective view of a vertical cable raceway in accordance with a second preferred embodiment of the present invention.

FIG. 9 is a perspective view of a vertical cable raceway 210 in accordance with a second preferred embodiment of the present invention. In this embodiment, the vertical cable raceway 210 comprises a double-channel assembly 220 and a pair of cover assemblies 60. The double-channel assembly 220 includes a double-trough 222 and two sets of cable guides 36. The double-trough 222 has a base member 24 and two double-side members 226, 228 extending perpendicularly therefrom, thereby forming two separate, back-to-back channels from a double-trough 222 having an H-shaped cross-section. The cable guides 36 and all other components of the raceway 210 of the second preferred embodiment are identical to those of the raceway 10 of the first preferred embodiment, with the second set of components being assembled and utilized in the same way as the first except in reverse.

Figure 10:
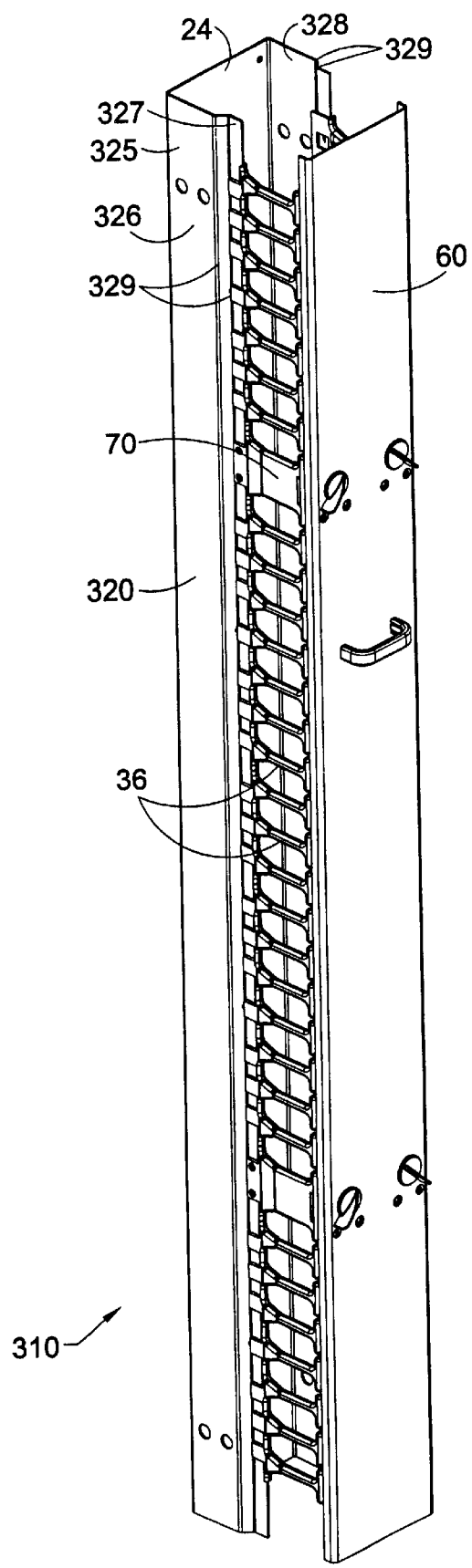
FIG. 10 is a perspective view of a vertical cable raceway in accordance with a third preferred embodiment of the present invention.

FIG. 10 is a perspective view of a vertical cable raceway 310 in accordance with a third preferred embodiment of the present invention. In this embodiment, the vertical cable raceway 310 comprises a modified single-channel assembly 320 and a cover assembly 60. The modified channel assembly includes an alternative trough 322 and a set of cable guides 36. The alternative trough 322 has a base member 24 and two modified side members 326, 328 extending perpendicularly therefrom. Unlike the trough 22 of the first preferred embodiment, each side member 326, 328 is bifurcated into primary and secondary planar members 325, 327 by a pair of closely spaced longitudinal bends 329. The secondary planar member 327 of each side member 326, 328 is thus offset slightly inward from, but parallel to, the primary planar member 325 of the side member 326, 328. The offset provides sufficient lateral space to accommodate the width of the cable guides 36 and cover supports 70 such that, when mounted on the trough 322, they do not extend beyond the outermost surfaces of the side members 326, 328. This feature thus helps to prevent the components of the raceway 310 from interfering with the rack 12 and the components and cables mounted thereon. The cover assembly 60, cable guides 36 and all other components of the raceway 310 of the third preferred embodiment are identical to those of the raceway 10 of the first preferred embodiment. Also, it should be obvious to one of ordinary skill in the art that the double-channel assembly 220 may be similarly modified.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A rack for mounting electronic equipment, the rack comprising:
    a pair of vertical support members for supporting at least one electronic component, wherein each of the vertical support members includes a regular pattern of mounting apertures that repeats linearly at a first regular interval; and
    a vertical cable raceway disposed generally adjacent one of the vertical support members, the raceway including:
        a trough; and
        a plurality of outwardly extending projections forming a plurality of cable rings, wherein the cable rings are disposed at a second regular interval along the length of the raceway, and wherein the second regular interval is a whole number multiple of the first regular interval.

2. The rack of claim 1, wherein each instance of the pattern of mounting apertures includes a plurality of mounting apertures.

3. The rack of claim 2, wherein the first regular interval corresponds to a whole number of standard rack mounting units.

4. The rack of claim 3, wherein the first regular interval is a single standard rack mounting unit.

5. The rack of claim 1, wherein each cable ring is disposed adjacent to a single instance of the pattern of mounting apertures and aligned therewith.

6. The rack of claim 1, wherein the second regular interval corresponds to a whole number of standard rack mounting units.

7. A method of routing cables in an equipment mounting rack, the method comprising the steps of:
    providing a rack having a series of mounting apertures arranged in a plurality of sets, thereby forming a regular pattern of apertures that repeats vertically at a first regular interval;
    providing a vertical cable raceway having a trough and a plurality of outwardly extending projections forming a plurality of cable rings, wherein the cable rings are disposed at a second regular interval along the length of the raceway, and wherein the second regular interval is a whole number multiple of the first regular interval; and
    attaching the raceway to the rack such that each cable ring is aligned with one set of mounting apertures.

8. The method of claim 7, wherein the first regular interval is one standard rack mounting unit.

9. The method of claim 8, wherein the second regular interval is one standard rack mounting unit.

10. A rack for mounting electronic equipment, the rack comprising:
    at least one pair of vertical support members for supporting at least one electronic component, the vertical support members defining the sides of the rack;
    a vertical cable raceway disposed generally adjacent one of the sides of the rack, the raceway including:

a trough; and a plurality of outwardly extending projections forming a plurality of cable rings, wherein each projection includes a reinforced base tapering to a narrow shaft and a crosspiece disposed at the distal end of the shaft, wherein each cable ring and each shaft have a vertical dimension, and wherein the vertical dimension of each cable ring is substantially larger than the vertical dimension of each shaft.

11. The rack of claim 10, wherein the vertical dimension of the each cable ring is more than three times as large as the vertical dimension of each shaft.

12. The rack of claim 10, wherein the distance between the centers of adjacent projections is substantially equal to a standard rack mounting unit.

* * * * *